(12) United States Patent
Klein et al.

(10) Patent No.: US 11,200,072 B2
(45) Date of Patent: Dec. 14, 2021

(54) USER INTERFACE ADAPTATIONS BASED ON INFERRED CONTENT OCCLUSION AND USER INTENT

(71) Applicant: MICROSOFT TECHNOLOGY LICENSING, LLC, Redmond, WA (US)

(72) Inventors: Christian Klein, Duvall, WA (US); Ryan Pendlay, Bellevue, WA (US); Lauren Edelmeier, Seattle, WA (US); Peter Hammerquist, Shoreline, WA (US); Christoffer Peter Hart Hansen, Seattle, WA (US); David Carl Naber, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/777,854

(22) Filed: Jan. 30, 2020

(65) Prior Publication Data

US 2021/0096885 A1 Apr. 1, 2021

Related U.S. Application Data

(60) Provisional application No. 62/909,224, filed on Oct. 1, 2019.

(51) Int. Cl.
*G06F 9/451* (2018.01)
*G09G 5/14* (2006.01)
(Continued)

(52) U.S. Cl.
CPC ............ *G06F 9/451* (2018.02); *G06F 1/1616* (2013.01); *G06F 11/3476* (2013.01); *G09G 5/14* (2013.01)

(58) Field of Classification Search
None
See application file for complete search history.

(56) References Cited

U.S. PATENT DOCUMENTS

2004/0056900 A1 3/2004 Blume et al.
2004/0095401 A1 5/2004 Tomimori
(Continued)

OTHER PUBLICATIONS

"International Search Report and Written Opinion Issued in PCT Application No. PCT/US20/040385", dated Oct. 20, 2020, 18 Pages.

(Continued)

*Primary Examiner* — Toan H Vu
(74) *Attorney, Agent, or Firm* — Newport IP, LLC; Jacob P. Rohwer

(57) ABSTRACT

A foldable computing device is disclosed that is configured to determine a user interface (UI) component rendering mode based on content occlusion and a prediction of user intent. The foldable computing device is configured to increase, maintain, or reduce prominence of a UI component based whether and where the UI component occludes an underlying application window or other existing UI. The foldable device may also determine an existing UI component's rendering mode based on an anticipated location of an application window associated with an application that was just launched. Furthermore, the foldable device may predict what a user is going to do with the application window, including causing any future occlusion, and adjust the UI component's rendering mode accordingly.

20 Claims, 12 Drawing Sheets

(51) Int. Cl.
    *G06F 1/16*     (2006.01)
    *G06F 11/34*    (2006.01)

(56) References Cited

U.S. PATENT DOCUMENTS

| | | | |
|---|---|---|---|
| 2006/0097955 A1 | 5/2006 | Kato | |
| 2009/0276729 A1* | 11/2009 | Cantu-Paz | G06F 16/954 |
| | | | 715/811 |
| 2010/0056224 A1 | 3/2010 | Kim | |
| 2010/0182265 A1 | 7/2010 | Kim et al. | |
| 2011/0138314 A1 | 6/2011 | Mir et al. | |
| 2011/0199361 A1 | 8/2011 | Shin | |
| 2014/0303839 A1* | 10/2014 | Lev | G06F 3/0481 |
| | | | 701/36 |
| 2014/0351748 A1 | 11/2014 | Xia et al. | |
| 2016/0048363 A1 | 2/2016 | Abullarade et al. | |
| 2017/0357292 A1 | 12/2017 | Cho et al. | |
| 2018/0239770 A1* | 8/2018 | Ghotbi | G06F 9/453 |
| 2018/0285047 A1 | 10/2018 | Jeune et al. | |
| 2018/0295146 A1* | 10/2018 | Kovega | H04L 63/1425 |
| 2018/0308452 A1* | 10/2018 | Zhang | G09G 3/2003 |
| 2018/0329508 A1 | 11/2018 | Klein et al. | |
| 2019/0279407 A1 | 9/2019 | Mchugh et al. | |
| 2019/0388011 A1* | 12/2019 | Johnson | A61B 5/1123 |
| 2020/0104334 A1* | 4/2020 | Khanna | G06F 16/9535 |
| 2020/0249798 A1 | 8/2020 | Sirpal et al. | |
| 2020/0257334 A1 | 8/2020 | Han | |
| 2020/0326900 A1 | 10/2020 | Kwon et al. | |
| 2021/0001227 A1* | 1/2021 | Farudi | A63B 71/06 |
| 2021/0096887 A1 | 4/2021 | Klein et al. | |

OTHER PUBLICATIONS

"Notice of Allowance Issued in U.S. Appl. No. 16/813,689", dated Mar. 24, 2021, 10 Pages.

"International Search Report and Written Opinion Issued in PCT Application No. PCT/US2020/051375", dated Mar. 5, 2021, 21 Pages.

* cited by examiner

LANDSCAPE POSTURES

PORTRAIT POSTURES

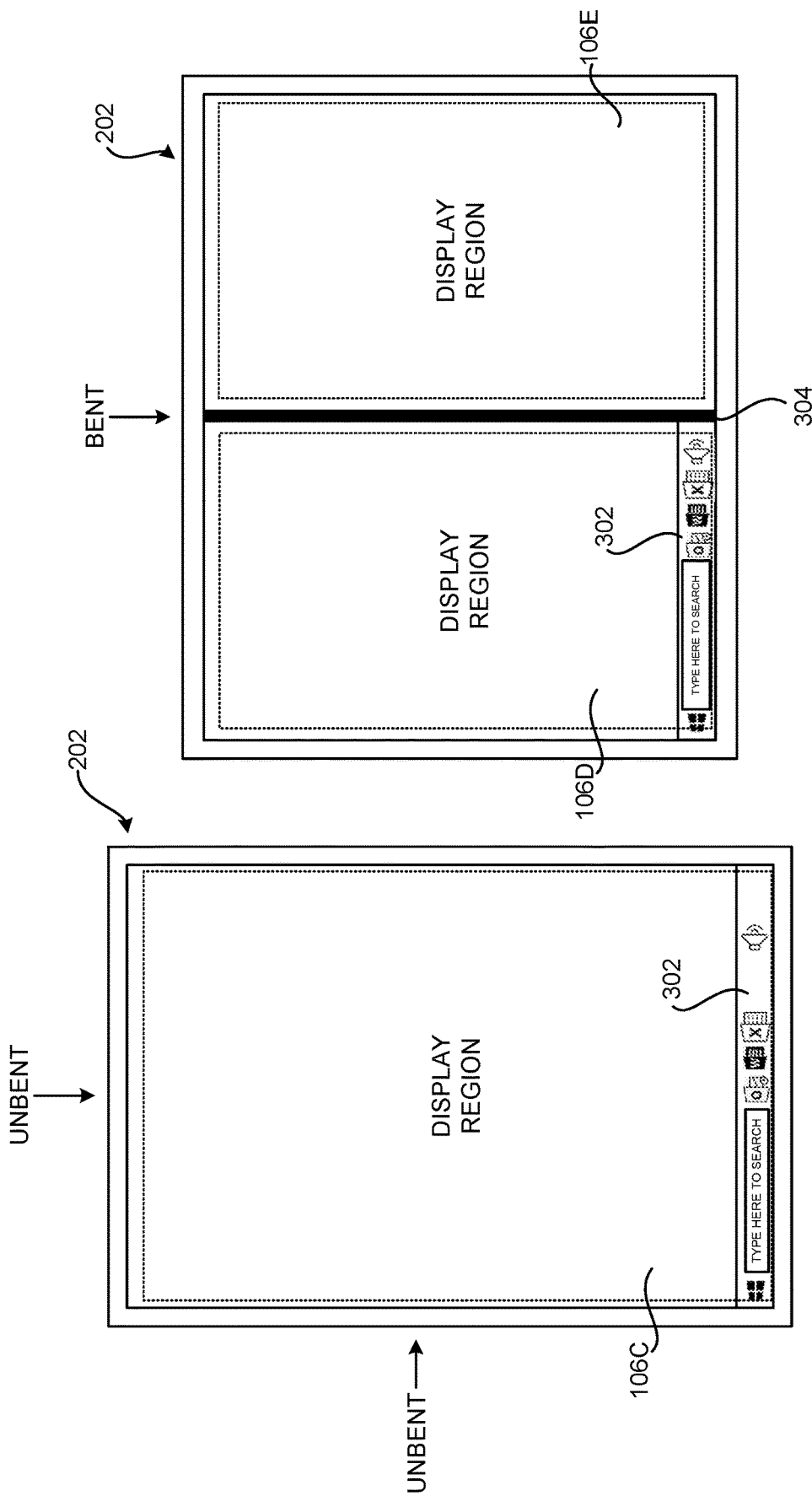

US 11,200,072 B2

USER INTERFACE ADAPTATIONS BASED ON INFERRED CONTENT OCCLUSION AND USER INTENT

This application claims priority to U.S. Provisional Application No. 62/909,224, entitled "UI ADAPTATIONS BASED ON INFERRED CONTENT OCCLUSION AND USER INTENT," which was filed on Oct. 1, 2019, and which is expressly incorporated herein by reference in its entirety.

BACKGROUND

Foldable computing devices include devices with two screens joined with a hinge or devices with bendable screens. These types of devices can provide benefits over traditional computing devices such as laptop computers. Commonly, however, these devices implement user interface ("UI") paradigms originally designed for computing devices with traditional form factors. As a result, UIs provided by foldable computing devices can be cumbersome and error-prone, which can lead to incorrect, inefficient, or inadvertent user input and unnecessary consumption of computing resources.

It is with respect to these and other technical challenges that the disclosure made herein is presented.

SUMMARY

Technologies are disclosed herein for determining a UI component rendering mode based on content occlusion and a prediction of user intent. Technologies are also disclosed for positioning UI components based on existing application layout and anticipated user workflows. The disclosed technologies address the technical problems described above by enabling foldable computing devices with multiple display regions to highlight or de-emphasize UI components that occlude existing UI content. In this way, user attention is drawn to important information while less-important information is de-emphasized. The disclosed technologies further address the technical problems described above by opportunistically moving UI components to enhance a predicted user workflow.

Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

Selecting a Rendering Mode for a UI Component Based on Content Occlusion

In one embodiment, a foldable computing device is configured to increase, maintain, or reduce prominence of a UI component based on whether and where the UI component occludes existing UI. Examples of UI components used throughout this document include a taskbar, start menu, and other operating system shell components, although any type of UI component from any type of application is similarly contemplated. Existing UI is any UI that was rendered in a location that the UI component would overlap with.

The foldable device may set the prominence of a UI component based on a comparison between a score associated with a UI component and a score associated with existing UI that would be occluded by the UI component. The scores may quantify a benefit to a user of displaying the UI component and the existing UI.

The foldable device may set the prominence of a UI component by displaying the UI component using a particular rendering mode. A rendering mode determines how the UI component is displayed, e.g. what sub-components of the UI component are selected for display, what level of opacity is applied to the UI component, whether the UI component auto-hides itself after a period of inactivity, etc.

The foldable device may display a UI component in a 'shy' rendering mode when the score associated with the UI component is deemed to be less than the score associated with the existing UI. For example, if a UI component with an average score overlaps a frequently used and therefore high scoring portion of the existing UI, the UI component may be displayed using a shy rendering mode.

In some configurations, all or part of a UI component displayed using a shy rendering mode may be displayed translucently. For example, a non-interactive or background portion of a UI component displayed using a shy rendering mode may be made translucent, allowing the existing UI to be perceived through the translucency. As another example, portions of a UI component displayed using a shy rendering mode and that occlude a high scoring portion of the existing UI may be made more translucent than portions of the UI component that occlude lower scoring portions of the existing UI.

In some configurations, one or more sub-components of a UI component displayed using a shy rendering mode may be rendered transparently. For example, a sub-component of a UI component may be replaced with an outline of itself, creating a window through which the existing UI may show through. A shy UI component may also omit or reduce the footprint of sub-components, nest sub-components in menus or tabs, auto-hide, or otherwise be smaller, less assertive, or more transient.

The foldable device may display a UI component using a 'normal' mode if, for example, the score associated with the UI component is greater than the score associated with the existing UI. A UI component displayed using a 'normal' mode may appear as it does in ordinary circumstances, taking up as much space and appearing as prominently as it normally does.

The foldable device may display a UI component using a 'proud' mode if a score associated with the UI component exceeds the score associated with the existing UI by at least a defined amount. For example, a UI component that alerts a user to a security concern, a particularly high scoring UI component, may be displayed using a proud mode even over existing UI that has recently received user interaction.

In some configurations, a UI component displayed using a 'proud' mode may be expanded by default or proactively displayed before a user requests it. For example, the foldable device may analyze multiple possible UI components in multiple possible locations in multiple possible display regions to determine if a UI component should be proactively displayed in a particular screen location.

In some configurations, in addition to basing a UI component's rendering mode on the presence and score of an existing UI that the UI component overlaps with, the foldable device may base a UI component's rendering mode on an anticipated location of an application window associated with an application that was just invoked. Furthermore, in some configurations, the foldable device may predict how a user will interact with an application window associated with the application being launched, including causing any future occlusion, and proactively adjust the rendering mode used to display a UI component that is expected to overlap with the application window.

Opportunistically Moving UI Components to Enhance a Predicted User Workflow

In some configurations, the foldable device changes the location of a UI component in order to reduce occlusion. For example, if the user invokes a calendar from a taskbar in a first display region, such that the calendar would ordinarily be displayed in the first display region, the foldable device may relocate the calendar to a second display region if the first display region is in use or the second display region is empty.

In some configurations, the foldable device may move the location of a UI component to a different display region if the invocation of the UI component is determined to be part of a workflow that will leverage the different display region. For instance, if an email application is open in the first display region when a user opens an email, and if the second display region is empty, the foldable device may determine that opening the email is part of a side-by-side task flow that will utilize both display regions. In situations such as these, the foldable device may display the email in the second display region.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B are device user interface diagrams illustrating various adaptations for multiple screen modes of bendable devices, according to one embodiment disclosed herein;

DETAILED DESCRIPTION

Figure 1B:
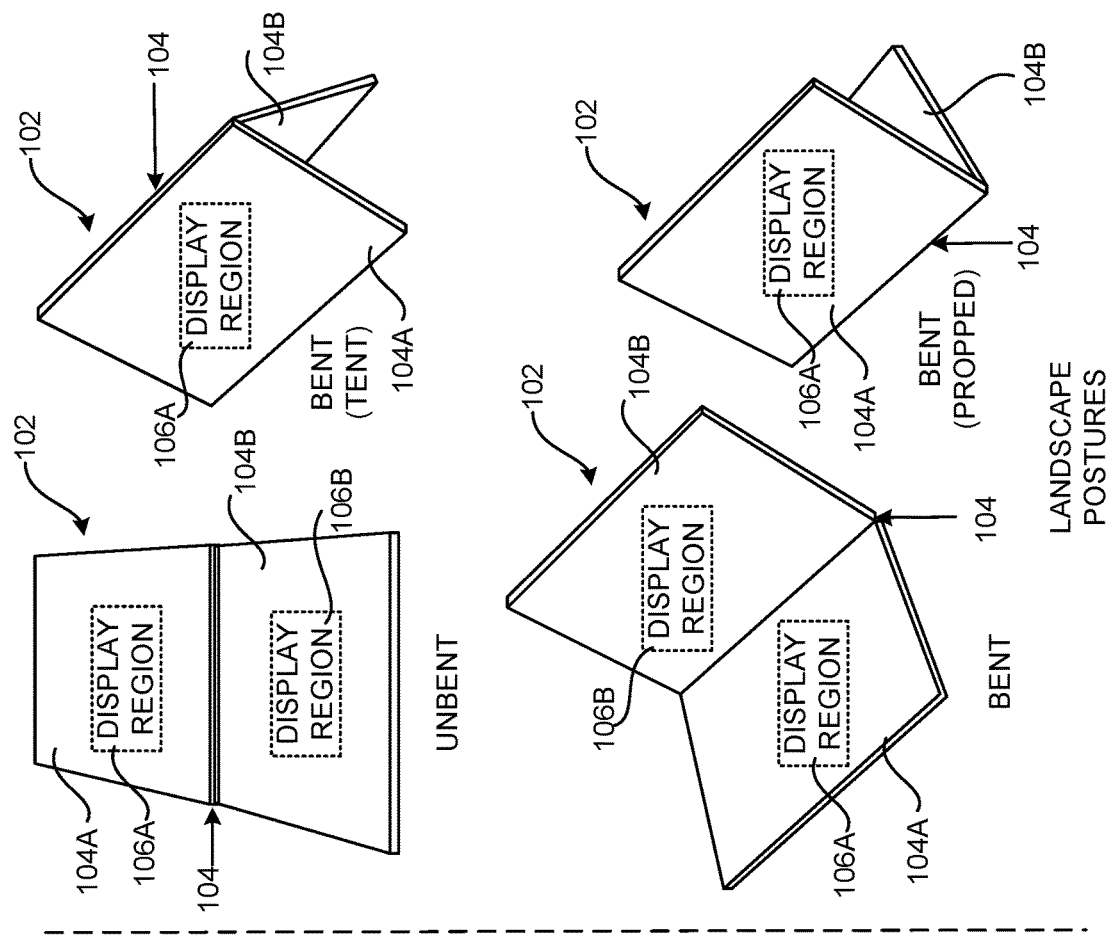
FIGS. 1A and 1B are device posture diagrams illustrating aspects of the configuration and operation of a hinged computing device that implements the disclosed technologies in one particular configuration.

The following detailed description is directed to technologies for selecting a rendering mode for a UI component based on content occlusion and a prediction of user intent. As discussed briefly above, implementations of the disclosed technologies can enable UIs to be provided that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for determining a UI component rendering mode based on content occlusion and a prediction of user intent will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also refer to computing devices having a bendable display screen (which might be referred to herein as "bendable devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
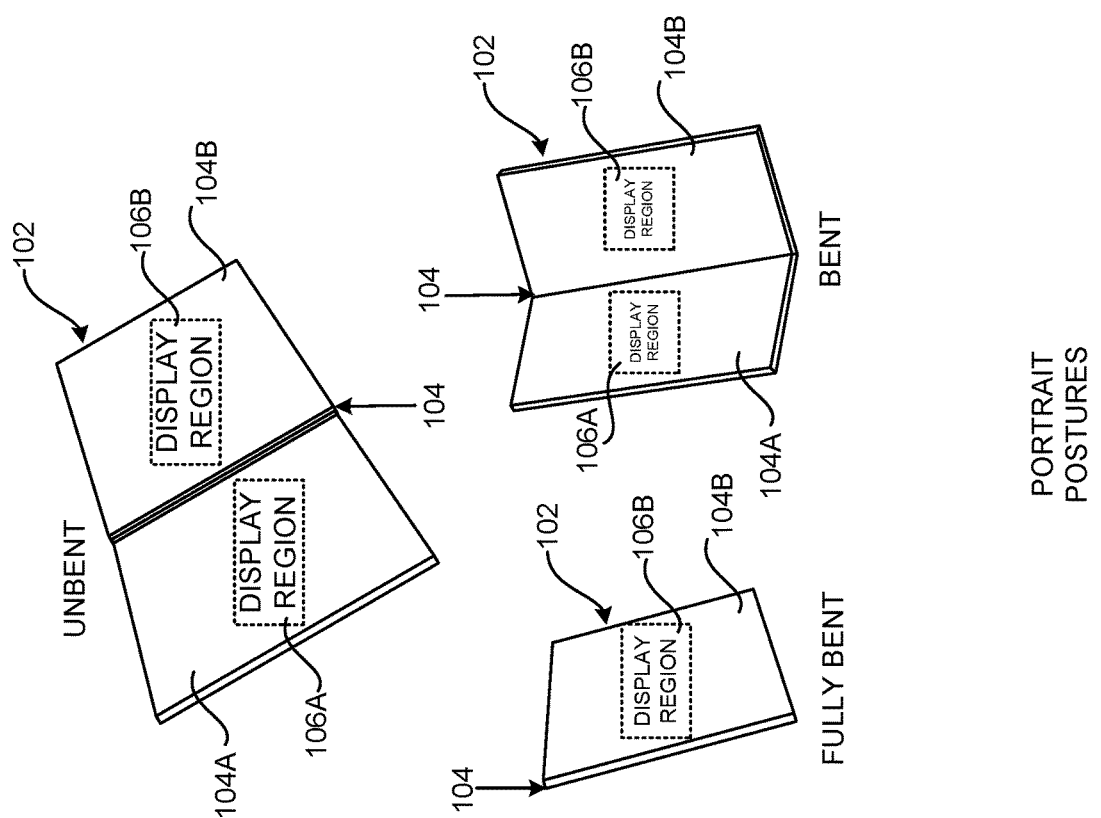

Referring now to FIGS. 1A and 1B, details regarding several postures for foldable display devices will be described. The examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 104 that connects two display devices 104A and 104B (which might be referred to herein as "displays"). In FIG. 1A, for instance, the hinged device 102 is shown in a flat posture where the display screens 104A and 104B are parallel to one another in portrait orientation, a completely open posture where only a single display 104B is visible in portrait orientation, and partially open posture in portrait orientation where the hinge 104 is bent. The hinged device 102 can also be configured in a closed posture (not shown) where neither display screen is visible.

In FIG. 1B, the hinged device 102 is shown in a flat posture where the display screens 104A and 104B are in landscape orientation, in tented and propped postures where the angle of the hinge 104 enables the hinged device 102 to stand on its own and present a single display 104A, and in a partially open posture where one display 104A is flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2B:
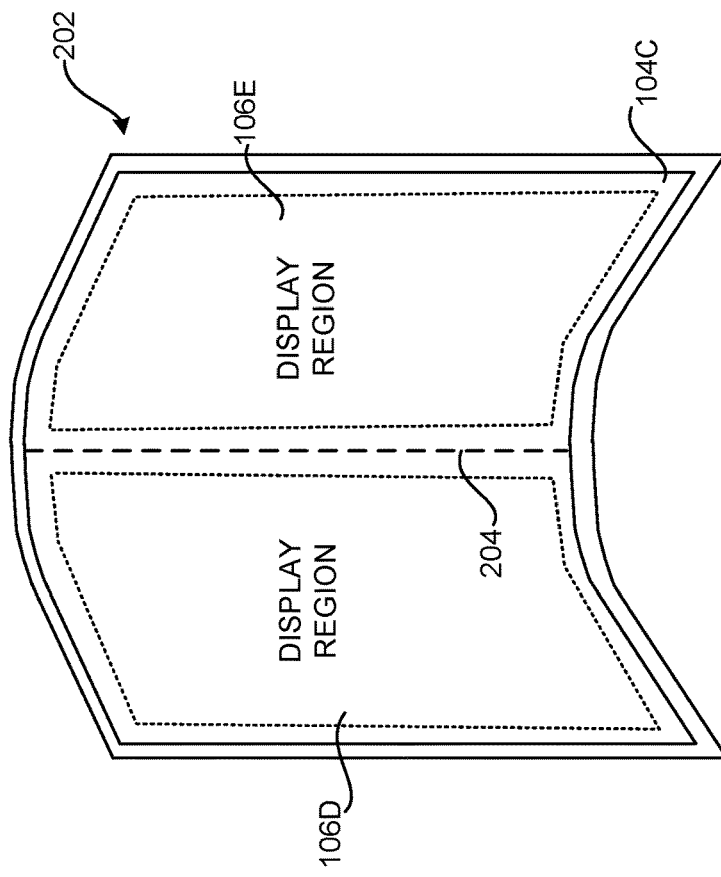
FIGS. 2A-2C are device posture diagrams illustrating aspects of the configuration and operation of a bendable computing device that implements the disclosed technologies in one particular configuration.
Figure 2A:
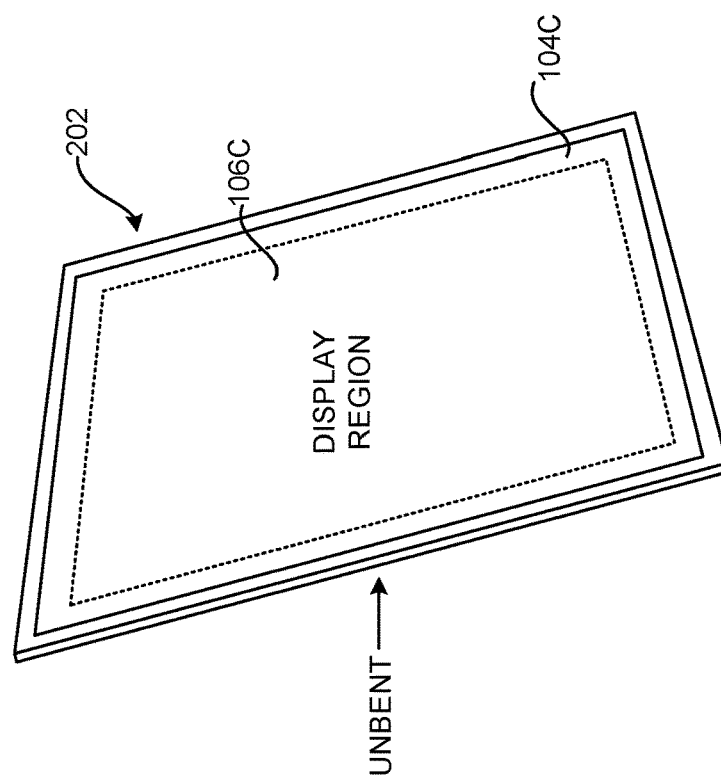

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in an unbent position, thereby presenting the entirety of the display 104C. The bendable device 202 can also be configured in a closed posture where neither display region is visible.

Figure 2C:
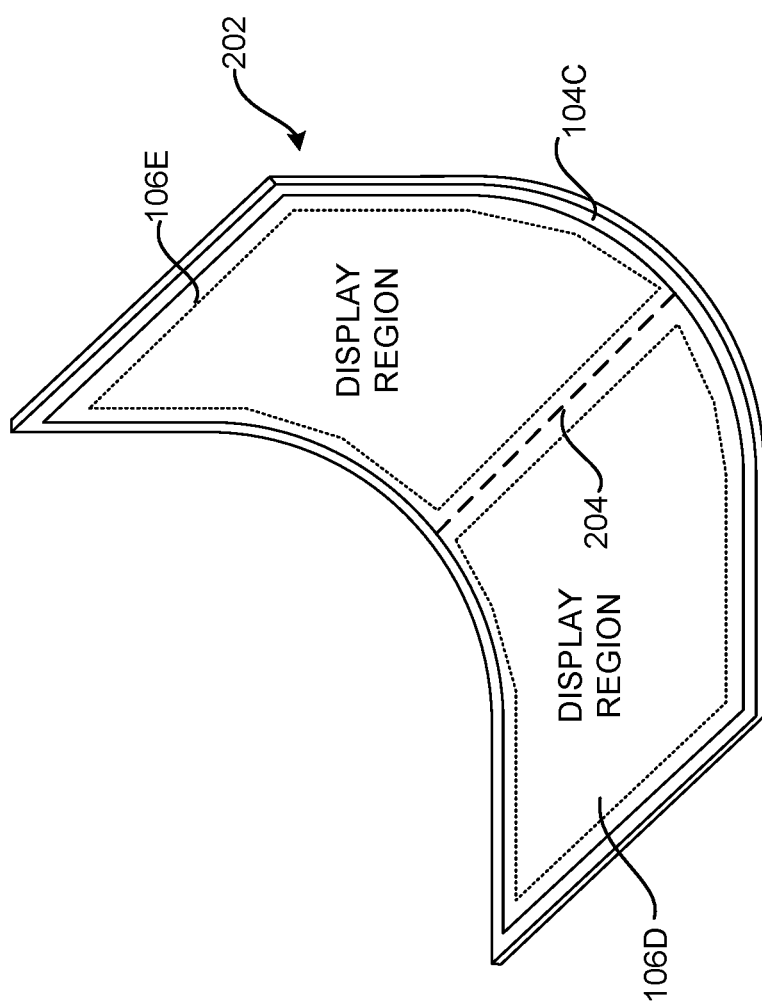

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation. In the example shown in FIG. 2C, the device 202 has been bent while the screen 104C is in portrait orientation.

When the bendable device 202 is bent, a crease or "fold" 204 is formed in the display 104C. The term "fold" as used herein might refer to the area where a foldable device is folded (i.e. the area of a hinge 104 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in an unbent state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Referring now to FIGS. 3A and 3B, details will be provided regarding various adaptations for multiple screen modes of bendable devices 202. It is to be appreciated that the bendable device 202 shown in FIGS. 3A and 3B (and FIGS. 4-9) have been shown two-dimensionally for ease of illustration. This is not, however, intended to indicate that the bendable device 202 is lying flat.

Prior to discussing FIGS. 3A and 3B and the other FIGS., it is also to be appreciated that certain relative terms (e.g. height, width, top, bottom, left, right) might be utilized herein to describe the configuration of the displays and display regions described herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another It is also to be appreciated that although generally described separately, the various embodiments described briefly above and in further detail below can be utilized in combination with one another.

As discussed briefly above, foldable devices can be manipulated between a portrait orientation as shown in FIG.

3A and a landscape orientation as shown in FIG. 3B. As also discussed above, these devices can be bent to various degrees by modifying the angle of a hinge. In the case of a hinged device 102, the hinge 104 is typically visible from the front and rear of the device. In the case of a bendable device 202, the hinge is not visible from the front of the device since the bendable display 104C encompasses the entirety of the device. Additionally, in both types of devices the hinge can be configured with a sensor capable of measuring the angle of bend of the hinge (i.e. the "hinge angle") and providing data to a processor of the device that specifies the hinge angle.

In one embodiment, a bendable device 202 is configured to dynamically transition between interaction modes that are optimized for single and multiple display regions 106 based on the hinge angle of the device 202. For example, and without limitation, a bendable device 202 might behave as if it has a single display screen and provide a single display region 106C when the device 202 is unbent. In this example, the display region 106C extends across the entirety of the display, including the area of the device 202 where the crease 204 would appear when bent. This interaction mode might be referred to herein as the "single display region mode."

A bendable device 202 might also behave as a dual screen device and provide multiple display regions 106D and 106E when the device 202 is bent. In the illustrated example, the display region 106D encompasses the entirety of the left side of the device 202 and the display region 106E encompasses the entirety of the right side of the device 202. This interaction mode might be referred to herein as "multiple display region mode." If the device 202 is in an unbent posture and transitions to a bent posture, the device 202 will transition from single display region mode to multiple display region mode. Similarly, if the device 202 is in a bent posture and transitions to an unbent posture, the device 202 will transition from multiple display region mode to single display region mode.

In one embodiment, an operating system presents a taskbar 302 across the bottom of the display screen of a bendable device 202. The taskbar 302 can provide various types of functionality including, but not limited to, launching applications, displaying notifications, displaying UI controls for configuring aspects of the operation of a device (e.g. changing the volume level), searching, viewing available applications, displaying the time, initiating a view of currently available windows, and others.

In the embodiment shown in FIG. 3A, the bendable device 202 displays the taskbar 302 across the entirety of the bottom edge of the display region 106C while in the single display region mode. When the device 202 transitions from single display region mode to multiple display region mode, the device 202 modifies the display of the taskbar 302 such that it encompasses only the bottom edge of one of the regions 106D and 106E. In the example shown in FIG. 3B, the taskbar 302 spans the bottom edge of the display region 106D, however, the taskbar 302 might be presented in the display region 106E in a similar manner in other embodiments. In the multiple display region mode, the taskbar 302 is often presented in either display region 106D or 106E, but taskbar 302 may also be presented across both display regions 106D and 106E at the same time.

When the device 202 is operating in the multiple display region mode, the UI presented by applications launched from the taskbar 302 will appear by default in the same display region as the taskbar 302. For instance, if the taskbar 302 is displayed in the display region 106D and utilized to launch an application, the UI provided by the launched application will be shown in the display region 106D. Similarly, if the taskbar 302 is displayed in the display region 106E and utilized to launch an application, the UI provided by the launched application will be shown in the display region 106E.

As also illustrated in FIG. 3B, an artificial hardware seam 304 can be presented at the approximate location of the fold 204 when the device 202 is operating in multiple display region mode. In one embodiment, the artificial hardware seam 304 is a vertical bar displayed on the display screen of the device 202 between the display regions 106D and 106E.

Selecting a Rendering Mode for a UI Component Based on Content Occlusion

Figure 4:
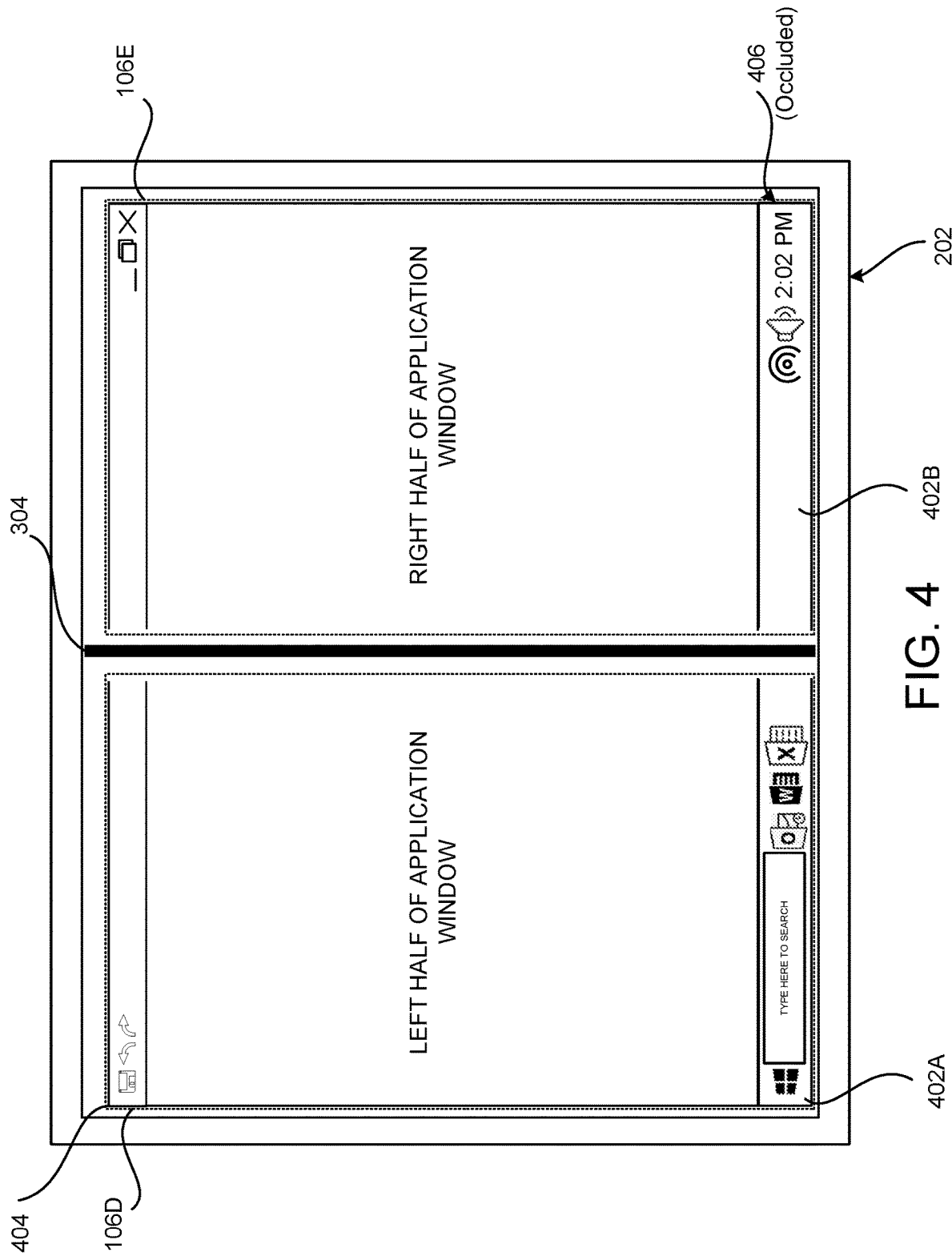
FIG. 4 is a device user interface diagram illustrating aspects of a window of an application that spans both regions of a foldable device and a taskbar displayed using a 'normal' rendering mode that occludes a bottom portion of the window of the application, according to one embodiment.

Turning now to FIG. 4, details will be provided regarding technologies for determining a UI rendering mode for a UI component based on comparison of a score of the UI component and a score of any existing UI that would be occluded by the UI component if displayed. "Existing UI" refers to a preexisting window of an application, dialog box, or other UI content. Existing UI may or may not be occluded by the UI component. For example, some of the existing UI may not be occluded if part of the UI component is made transparent. Existing UI may also not be occluded if the UI component is displayed in a different location. "Occluded UI" refers to existing UI that is actually occluded by the UI component.

In one configuration, foldable device 102 computes a score associated with the UI component and a score associated with any existing UI. In some configurations, a score represents a predicted amount of utility or other benefit that the UI component will provide to a user. For example, foldable device 102 may assign higher scores to UI components that provide information to the user, or that enable the user to perform a function. The urgency of the information and the importance of the function may also affect the score.

A score may be calculated based on historical usage data of the UI component. For example, foldable device 102 may assign a higher score to a UI component that has been interacted with more than an average UI component. Similarly, foldable device 102 may assign a lower score to a UI component that has been dismissed, minimized, or moved to a peripheral location on the display more than an average UI component.

Foldable device 102 may then vary the appearance of the UI component based on whether, and to what extent, the score of the UI component exceeds the score of the existing UI. The foldable device may vary the appearance of a UI component by displaying the UI component using a particular rendering mode. A rendering mode determines how the UI component is displayed, e.g. what sub-components of the UI component are selected for display, what level of opacity is applied to the UI component, whether the UI component auto-hides itself after a period of inactivity, etc.

When the difference between the scores is large and positive, i.e. when the score associated with the UI component is greater than the score associated with the existing UI by at least a defined amount, foldable device 102 may give the UI component a high prominence by displaying the UI component using a proud rendering mode.

When the difference is negative, i.e. the score of the UI component is less than the score of the occluded UI, then foldable device 102 may give the UI component a low prominence by displaying the UI component using a shy rendering mode. When the difference between the scores does not reach either of these thresholds—i.e. the score associated with the UI component to be displayed is greater than the score associated with the existing UI, but by less than the defined amount, foldable device 102 may give the UI component a medium prominence by displaying the UI component using a normal rendering mode.

While 'normal', 'shy', and 'proud' rendering modes are used throughout this document, these names and delineations are examples—other types of rendering modes that affect how a UI component renders and responds to user input are similarly contemplated.

In one particular example, foldable device 102 may display taskbar 302 using a normal rendering mode in response to determining that the score associated with taskbar 302 is greater than the score associated with the existing UI 406 of the application window 404, but by less than the defined amount. The score of taskbar 302 may exceed the score of existing UI 406 of application window 404 for a number of reasons. For example, existing UI 406 may display non-essential information, or no information at all, causing a lower score.

Furthermore, taskbar 302 may provide functionality, e.g. switching between running applications, that has been used more often than other UI components, causing an increased score. Taskbar 302 may also display intrinsically high value information, e.g. security information, login information, battery life information, etc., further causing an increased score. In some embodiments, when taskbar 302 is displayed using a normal rendering mode, taskbar 302 displays a complete set of standard icons and other sub-components. Additionally, or alternatively, when taskbar 302 is displayed using a normal rendering mode, taskbar 302 may be set to full opacity.

In some configurations, determining that taskbar 302 is associated with a higher score than the occluding UI may include identifying one or more portions of application window 404 that will be occluded and comparing the scores of these portions to the scores of the taskbar 302. Each application window may be associated with a predetermined list of portions, e.g. edge portions, corner portions, or the like, and a corresponding list of scores for each predetermined portion. The list of portions may be universal to all applications, or particular to specific applications or types of applications. Similarly, the list of scores associated with each portion may be universal to all applications or particular to specific applications or application types. The predetermined list of portions and corresponding scores may be hand-selected by a developer of application window 404, the developer of occluding UI components such as taskbar 302, or a user.

Portions of application window 404 may also be automatically identified based on historical user interface interactions, such as a history of where within an application window the mouse cursor tends to be, where mouse clicks tend to be performed, etc. For applications that allow text editing, portions may be identified as regions where an insertion point (also referred to as a 'caret') tends to be located, or where the insertion point tends to be located when keyboard input is received. For example, foldable device 102 may identify a cluster of locations where user interactions occur and define a portion of the application window as a geometric shape that encloses the cluster. A cluster may be a set of user interaction locations having at least a defined density, e.g. at least 250 interactions per square inch per hour.

In another embodiment, a portion may be automatically identified as one or more windows, dialog boxes, controls, or other user interface elements within the application window. For example, if foldable device 102 determines that a significant amount of mouse input is received within a status bar at the bottom of the application window, the entire status bar UI element may be considered a portion of the application window.

In some configurations, portions of the application window or the values associated with those portions may change based on the location, size, and/or shape of the application window 404. For example, an application window 404 may have a low-value portion along the bottom when a height of the application window 404 is greater than a defined amount, or if the application window 404 is maximized. However, the same application window may not have a low-value portion along the bottom if the application window is smaller than the defined amount, e.g. when all of application window 404 displays high value content. In some configurations, historical user interaction data may be analyzed to determine the defined height at which a region becomes high or low valued.

Regardless of how portions of the application window are determined, historical data collected from user interactions with application window 404 may be programmatically analyzed to determine which portions have low, average, and high scores for a particular user. For example, a history of user interface interactions similar to those discussed above with regard to identifying portions may be analyzed to determine how frequently a current user has been interacting with the portions. Frequency of interaction may then be used to determine a score of a given portion. The scores of portions of application windows may be calculated based on recent interactions made by the user or based on the user's entire user interaction history.

In some embodiments, portions of the application window may be assigned a score based on an analysis of content within the portions. For example, text that is repeated throughout or across documents may be considered to have a low score, as the repeated text is likely to be boilerplate. Text from different portions of the application window may also be analyzed by a machine learning classifier to identify a score of the portion. In some configurations, a content-based analysis may be combined with a user-interaction history analysis to assign a score to portions of an application window.

FIG. 4 illustrates a UI component, taskbar 302, displayed using a 'normal' rendering mode. In some configurations, a 'normal' rendering mode is a rendering mode that applies a default configuration, including a level of opacity, number and type of constituent UI sub-components, and the like. While the specifics of what is 'normal' may be different for different UI components, many UI components displayed using a 'normal' rendering mode will be nearly or completely opaque. 'Normal' rendering modes will also often expose functionality with directly accessible icons, as opposed to moving icons to a menu that must first be activated before accessing the icon. 'Normal' rendering modes will also often remain fixed in location, i.e. without automatically collapsing or otherwise hiding after a defined period of time of inactivity.

While taskbar 302 is used as an example of a UI component in FIG. 4, other UI components are similarly contemplated, including a task launching menu (e.g. 'Start Menu'), pop-up dialog boxes, security confirmation screens, pinned or 'always on top' applications, run dialog boxes, performance monitors, task managers, etc. Similarly, while application window 404 is displayed across regions 106D and 106E, a 'normal' rendering mode may also be used when taskbar 302 occludes an application window displayed in a single region.

Figure 5:
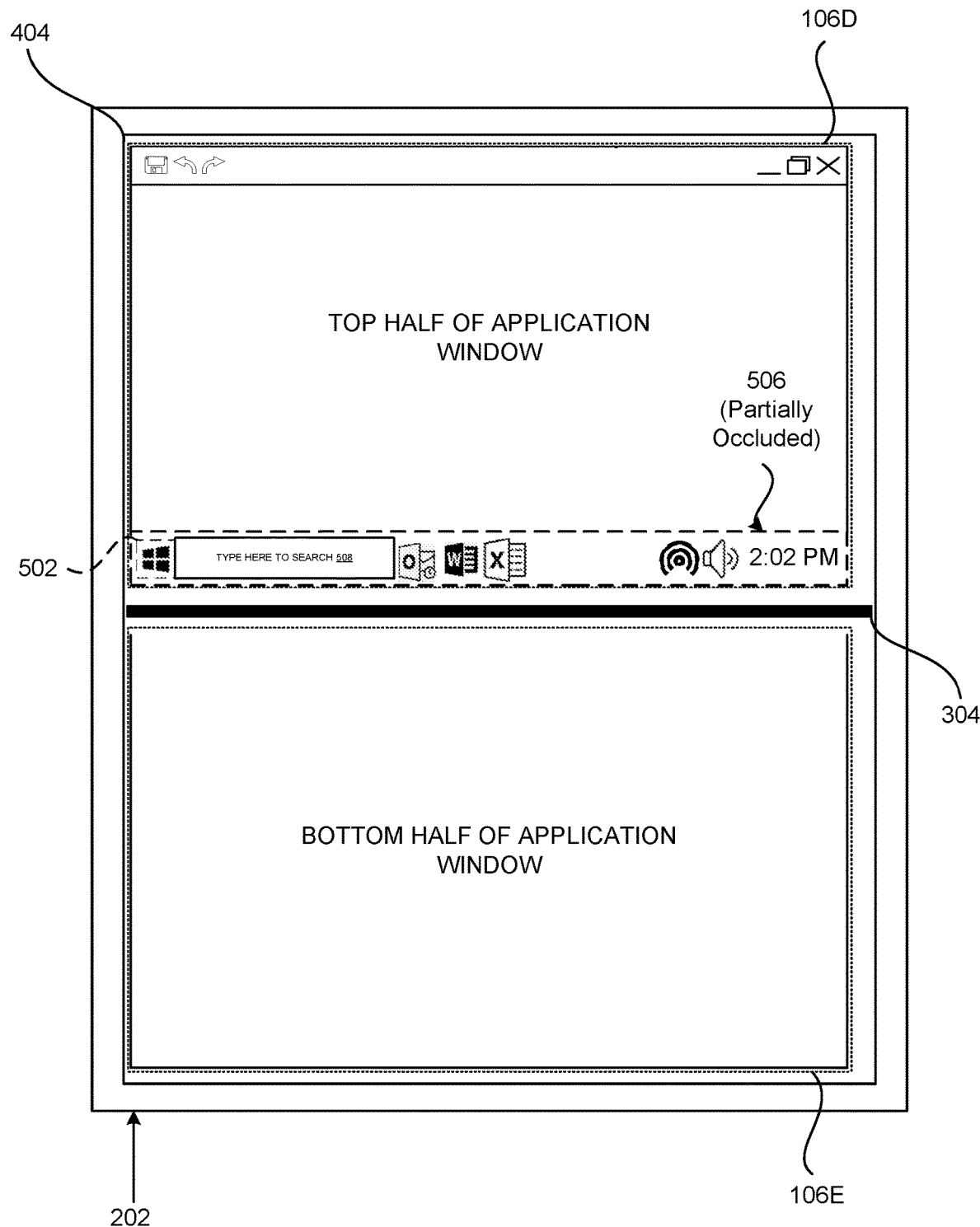
FIG. 5 is a device user interface diagram illustrating aspects of a window of an application that spans both regions of a foldable device and a taskbar displayed using a 'shy' rendering mode that occludes a middle portion of the window of the application, according to one embodiment.

FIG. 5 is a device user interface diagram illustrating aspects of taskbar 502 displayed using a 'shy' rendering mode that occludes a middle portion 506 of application window 404. A 'shy' rendering mode may be selected when foldable device 102 determines that the UI component would occlude central, important, or frequently used information in the existing UI. A shy rendering mode may cause some or all of a UI component to be transparent or translucent. A UI component displayed using a shy rendering mode may also present a minimized user interface, e.g. a user interface that places icons in menus, uses smaller versions of icons, etc. A UI component displayed using a shy rendering mode may also be transient, e.g. having a user interface that automatically hides itself.

Foldable device 102 may display taskbar 502 using a shy rendering mode based on a determination that a score associated with taskbar 502 is less than a score associated with the existing UI, e.g. a score associated with portion 506 of application 404. Foldable device 102 may make this determination based on an analysis similar to the analysis described above in conjunction with FIG. 4, e.g. by identifying a list of portions of application window 404 that would be occluded by the UI component, and comparing the scores of each portion to the score of taskbar 502. If one or more of the occluded portions have a score higher than the score of taskbar 502, then taskbar 502 may be displayed using a shy rendering mode.

In some configurations, a portion of a UI component may be displayed using a normal rendering mode while another portion of the same UI component may be displayed using a shy rendering mode. For example, if portions of taskbar 502 have a higher score than portions of the existing UI, those portions of taskbar 502 may be displayed using a normal rendering mode. However, if other portions of taskbar 502 have a lower score than portions of the existing UI, these other portions of the taskbar 502 may be displayed using a shy rendering mode.

Taskbar 502 is but one example of a UI component that may be displayed using a shy rendering mode—other UI components and other types of UI components, e.g. windows, menus, icons, dialog boxes, etc., may similarly be displayed using a shy rendering mode.

In some configurations, when determining a score associated with a UI component relative to a score associated with the existing UI, a negative impact of the occlusion itself may reduce the score associated with the UI component. In this way, a UI component associated with a greater score than the score associated with the existing UI may still be displayed using a shy mode. For example, if UI components and portions of existing UI are scored on a scale of 1-100, with 1 being little to no value and 100 being the upmost value, a UI component with a score of 55 would ordinarily be set to a normal rendering mode if it occludes existing UI associated with a score of 53. However, if foldable device 102 determines that the occlusion itself reduces the score of the UI component by 5, for an effective score of 50, then the UI component would be displayed using a shy rendering mode despite nominally having a greater score than the existing content.

A shy rendering mode may cause a UI component like taskbar 502 to be translucent, as depicted by the dashed lines in FIG. 5. By displaying taskbar 502 translucently, foldable device 102 allows existing UI 506 to also be visible while maintaining the normal number and type of sub-components of taskbar 502. As illustrated, taskbar 502 includes the same number of icons and other sub-components as taskbar 302, which was rendered normally.

In some configurations, the level of translucence may be set based on a degree to which the score associated with the existing UI is greater than the score associated with the UI component. Translucency may be set as a percentage of the translucent image attributable to the existing UI. For example, a translucency percentage of 70% means that 70% of the blend between UI component and existing UI comes from the existing UI. A translucency percentage of 70% may be considered high, reserved for instances where the existing UI has a significantly higher value than the UI component.

For example, if the UI component has a score of 20 while the existing UI has a score of 65, for a net score difference of 45, foldable device 102 may set the translucency of the UI component to 70%. A smaller difference in score, e.g. a UI component with a score of 55 and an existing UI score of 65, may correspond to a translucency of 50%, as the existing UI and the UI component have comparable scores.

Displaying a UI component like taskbar 502 using a shy rendering mode may also cause taskbar 502 to be partially transparent, i.e. sub-components of taskbar 502 may be rendered as outlines, allowing the existing UI to appear within the outlines. For example, search box 508 may allow existing UI to be completely visible apart from the outline of the search box and any text contained therein.

Figure 6:
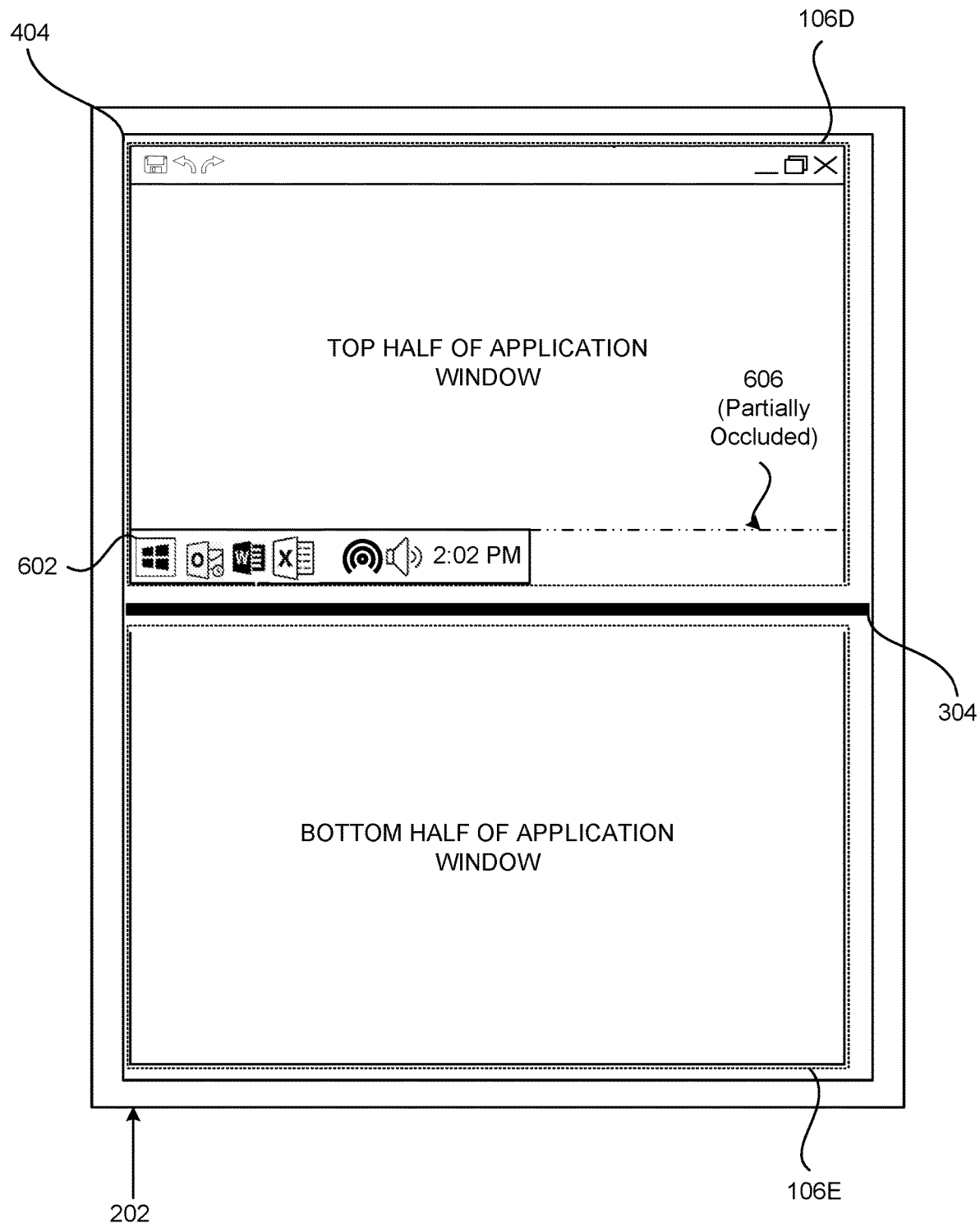
FIG. 6 is a device user interface diagram illustrating aspects of a window of an application that spans both regions of a foldable device and a taskbar displayed using a 'shy' rendering mode that occludes a middle portion of the window of the application, according to one embodiment.

Turning now to FIG. 6, details will be provided regarding application window 404 that spans both regions 106 of foldable device 102 and taskbar 602 displayed using a 'shy' rendering mode that occludes a middle portion 606 of application window 404. The shy rendering mode depicted in FIG. 6 puts taskbar 602 into a condensed mode, omitting non-essential sub-components, minimizing the size of sub-components, placing sub-components in menus and tabs, and otherwise taking measures to reduce the overall size of taskbar 602. The condensed mode of taskbar 602 may be rendered opaquely, such that some of application window 404 remains occluded.

In some configurations, taskbar 602 may also be made translucent. Other techniques for displaying a UI component using a shy rendering mode include automatically hiding taskbar 602, reducing taskbar 602 to a single icon that can be activated to show some or all of taskbar 602, and the like. For example, taskbar 602 may collapse to a single icon after a defined period of not being used. Foldable device 102 may detect a touch on the single icon, and in response, restore some or all of taskbar 602.

Figure 7:
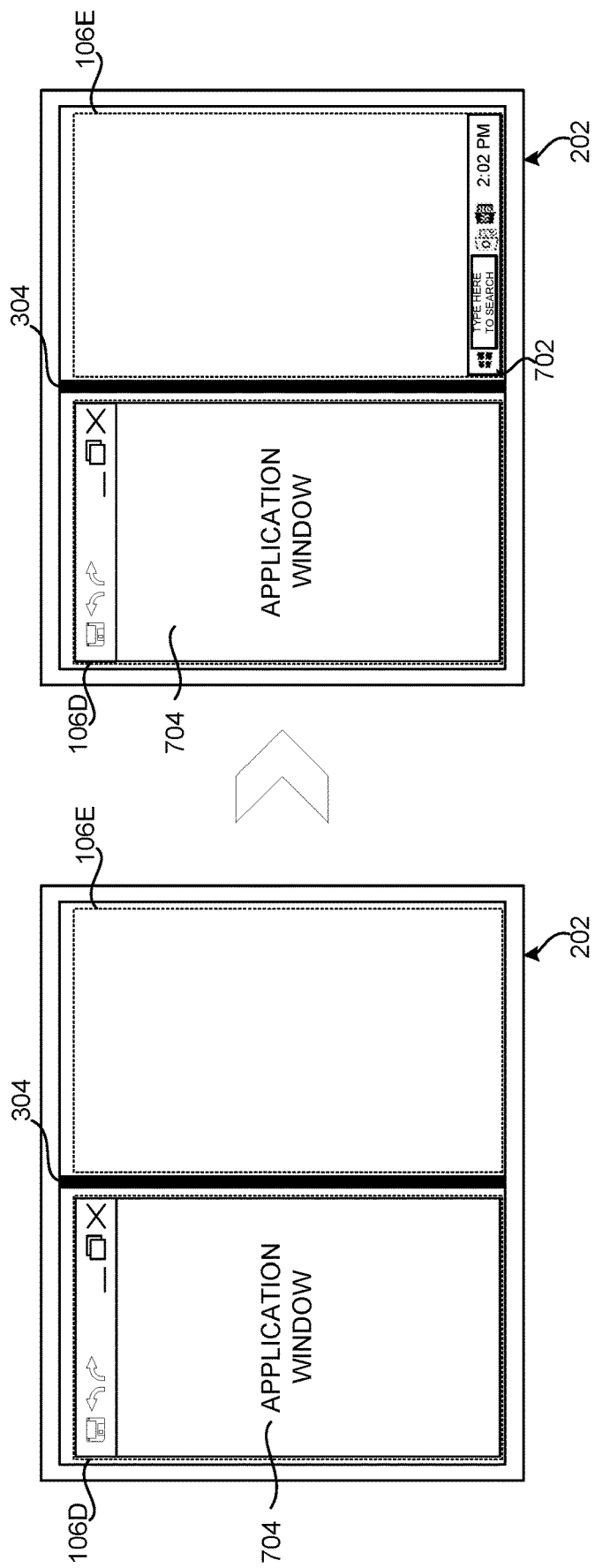
FIG. 7 is a device user interface diagram illustrating aspects of the operation of a window of an application that spans one region of a foldable device and a taskbar that is displayed using a 'proud' rendering mode and that appears unprompted in an empty display region, according to one embodiment.

Turning now to FIG. 7, details will be provided regarding application window 704 that spans region 106D of foldable device 102 and taskbar 702 that is displayed using a 'proud' rendering mode and that appears unprompted in empty display region 106E. In some embodiments, when a UI component such as taskbar 702 is displayed using a 'proud' rendering mode, the UI component displays the UI component using an expanded mode, in contrast to using a normal mode or an auto-hiding mode. An expanded mode may fill an unused portion of region 106D, such that the proud UI component takes up as much space as it needs without causing occlusion. As depicted in FIG. 7, foldable device 102 determines that there would be no occlusion if taskbar 702 were to appear in region 106E, which is empty.

Foldable device 102 may determine that the score associated with taskbar 702 is greater than the score associated with the empty space of region 106E. For example, since application windows are by default located in the display region of the UI component used to launch them, the score associated with displaying taskbar 702 in region 106E may be based in part on making it convenient for a user to launch a second application having a window in region 106E for side-by-side operation with application window 704. This score may be greater than the score of empty space in region 106E—i.e. this score may be greater than the score of not disturbing the user with the unsolicited appearance of taskbar 702. Foldable device 102 may determine that a user would value launching a second application having a window in a side-by-side operation with application window 704 based on how often application window 704 and the second application window were historically used in a side-by-side configuration.

In some configurations, while spontaneously displaying taskbar 702 using a proud rendering mode, taskbar 702 may display, highlight, or otherwise call attention to other applications that have historically been executed concurrently with application window 704, e.g. that have historically been executed with application window 704 in a side-by-side mode. For example, taskbar 702 may include 'quick-launch' icons for applications associated with application window 704. In some configurations, the 'quick-launch' icons provided in the proud rendering mode may not be the icons provided by a taskbar in a normal or shy rendering mode.

Furthermore, the 'quick-launch' icons provided in the proud rendering mode may vary based on the application window 704, the type of application that renders application window 704, an action recently taken by a user in application window 704, etc. This enables a user of foldable device 102 a convenient means to launch an application into region 106E when the application is commonly displayed side-by-side with application window 704. In some configurations, foldable device 102 periodically analyzes potential UI components like taskbar 702 to determine if any of the potential UI components have a high enough score to warrant proactively displaying themselves without user input.

Displaying taskbar 702 in empty space when a user is predicted to want to launch another application into region 106E is one reason to set the UI component into a proud rendering mode. Other UI components, such as an application launch menu (e.g. 'Start' menu) are similarly contemplated, as are other criteria for determining when the score associated with displaying the UI component using a proud rendering mode is greater than not displaying the UI component using the proud rendering mode. It is further considered that UI components displayed using other rendering modes, e.g. shy or normal, may be displayed in a non-default location such as a different location on the default display region or a location on a different display region.

In some configurations, in addition to considering actual occlusion created by a UI component over existing UI, foldable device 102 may predict where a recently launched application window will be displayed and how the user will interact with the recently launched application window based on a task context, i.e. the number, type, and location of already running applications.

For example, an application window for viewing video content may have one task context for browsing videos, and a different task context for watching a full screen video. A word processing application window may have a first task context for editing a document, a second task context for viewing a document, a third task context for reviewing a document, etc. This task context information may be used to display a UI component in a particular rendering mode. For example, if the current task context and historical usage data indicate that a recently launched web browser may be used to view a full-screen video, any UI components that do overlap with or are expected to overlap with the recently launched application window may be set to a shy rendering mode.

Figure 8:
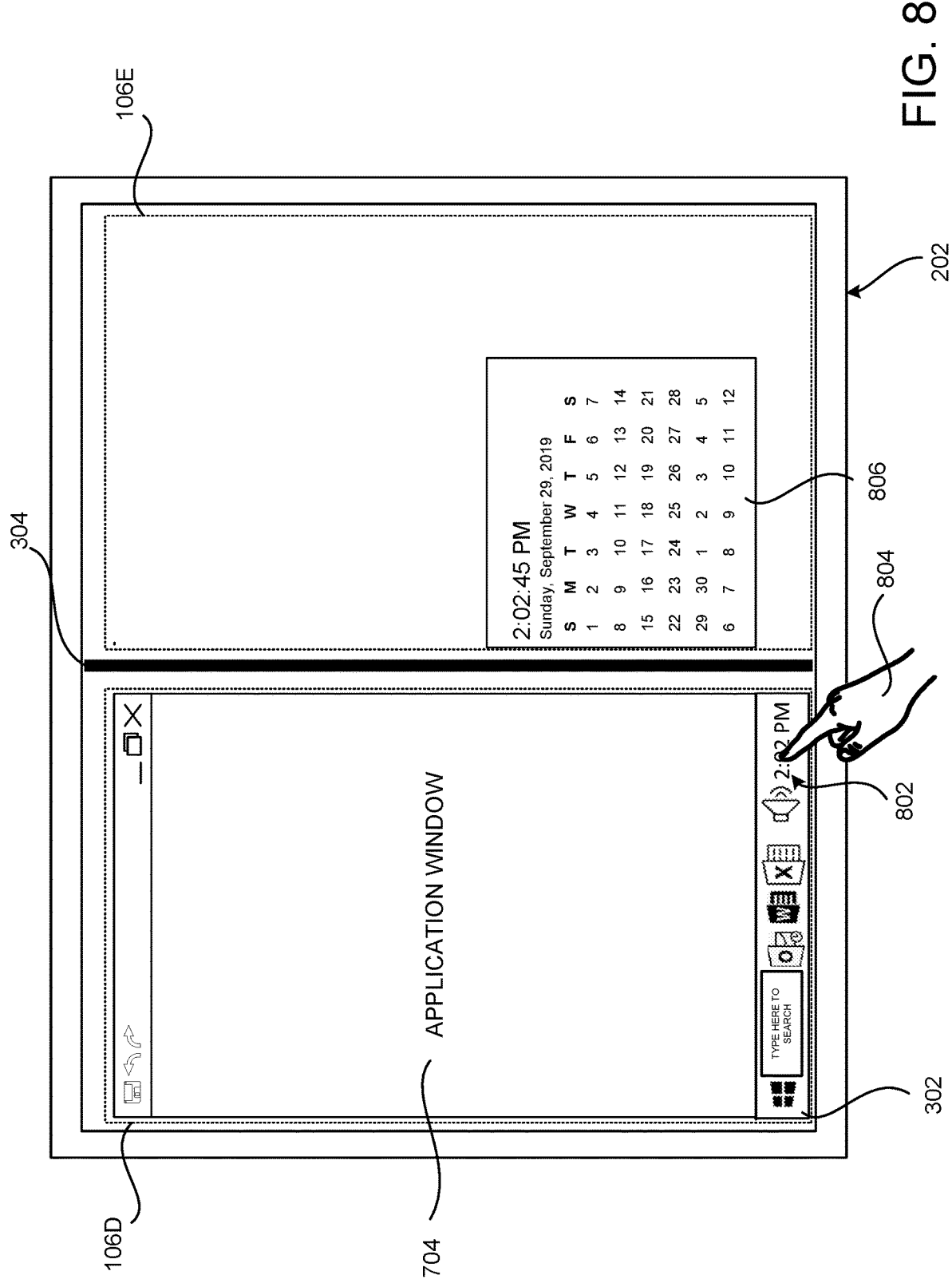
FIG. 8 is a device user interface diagram illustrating aspects of the operation of a window of an application displayed in one region of a foldable device and a UI component that is displayed in an empty region to avoid occluding the window of the application, according to one embodiment.

Turning now to FIG. 8, details will be provided regarding an application window 704 running in region 106D of foldable device 102 and UI component 806 that is displayed in empty region 106E to avoid occluding application window 704. In this example, taskbar 302 includes a clock display 802. In response to a touch by pointer 804, clock display 802 may cause UI component 806, a calendar, to be rendered. Pointer 804 may be a finger, stylus, pen, or other device capable of interacting with the touch sensor of region 106D. Ordinarily, clock display 802 would display UI component 806 in region 106D, where clock display 802 is located.

However, aspects of the disclosed embodiments cause UI component 806 to be displayed in region 106E. In this example, region 106E is empty, and so the score associated with displaying UI component 806 in region 106E is determined to be greater than the score associated with rendering component 806 in region 106D, where it would occlude a portion of application window 704. Accordingly, foldable device 102 displays UI component 806 using a proud rendering mode, causing UI component 806 to be proactively displayed in region 106E. In some embodiments, if foldable device 102 displays other content in the portion of region 106E in which UI component 806 is displayed, such that UI component 806 is occluding the other content in region 106E, foldable device 102 may re-locate the UI component 806 to the default location in region 106D.

Figure 9:
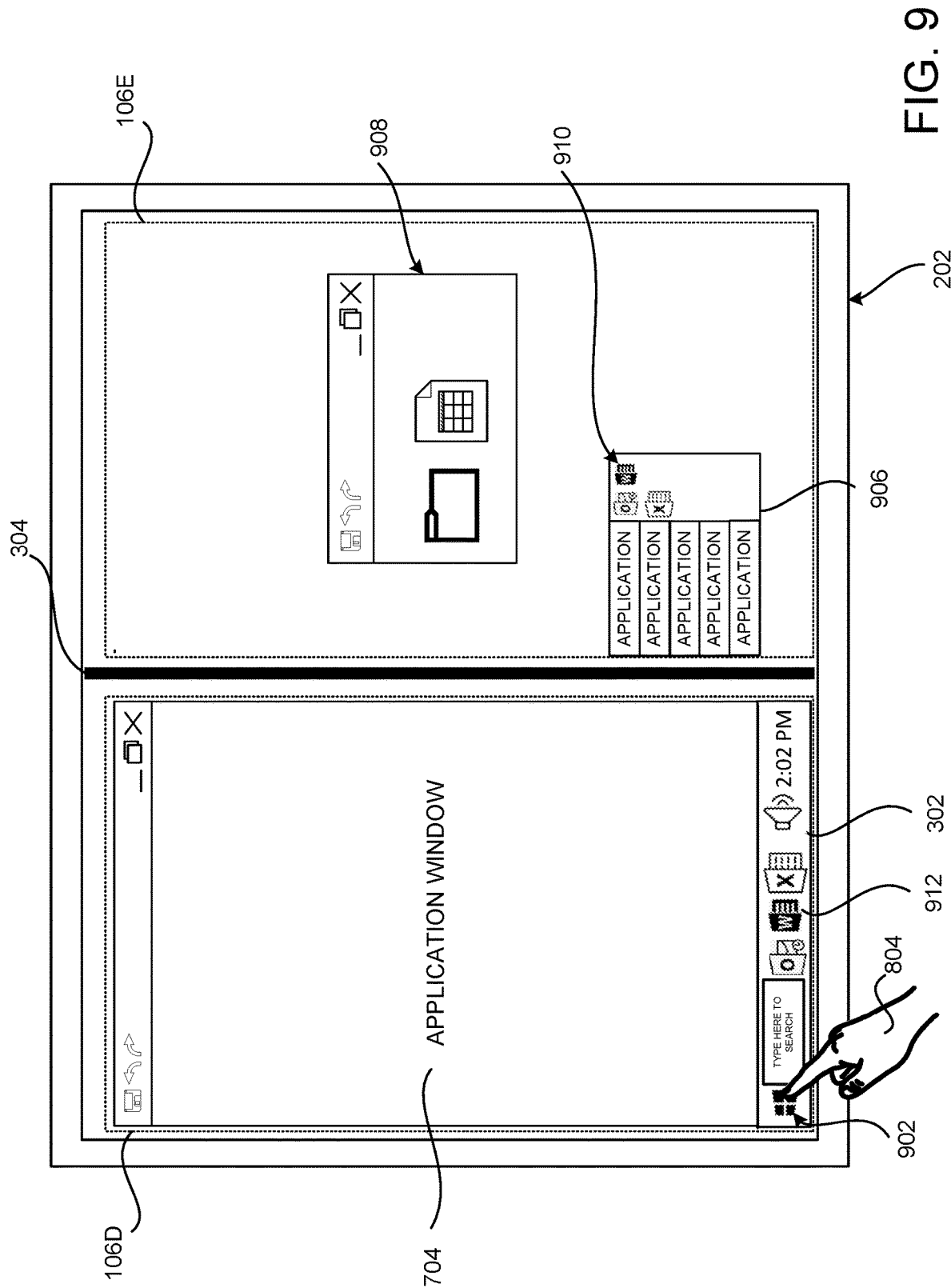
FIG. 9 is a device user interface diagram illustrating aspects of the operation of a window of an application displayed in one region of a foldable device and a UI component that is displayed in an empty region to avoid occluding the window of the application, according to one embodiment.

Turning now to FIG. 9, details will be provided regarding an application window 704 running in region 106D of a foldable device and a UI component 906 that is displayed in empty region 106E to avoid occluding application window 704. In some configurations, an application launching menu 906 is invoked by pointer 804 touching icon 902. Ordinarily, application launching menu 906 would appear above icon 902 in region 106D. However, foldable device 102 may determine that region 106E is empty, that application launching menu 906 may occlude application window 704, and so there is more value in displaying application launching menu 906 in region 106E than in region 106D.

Another factor in determining to display application launching menu 906 in region 106E is that any application windows 908 rendered by an application launched via application launching menu 906 would be located in region 106E, creating a side-by-side workflow with application window 704. This enables the foldable device 102 to display application launching menu 906 in region 106E for the purpose of entering an application workflow that displays application window 704 and a different application window side-by-side. For example, foldable device 102 may determine that application window 704 is often part of a side-by-side application workflow with a word processing application. While a side-by-side workflow is described, this is just one example. Other types of workflows are similarly contemplated, including parent-child, tiled, tabbed, or any other way in which two or more applications may be related as displayed. Workflows may also include a time or sequence component, e.g. a defined sequence in which applications in the workflow are presented to a user.

The determination that application window 704 is often part of a side-by-side workflow with a word processing application may be made based on a history of use of application window 704 in a side-by-side configuration with the word processing application. In some configurations, the determination may be based on a history of use of application window 704 in a side-by-side configuration with any word processing application. This determination may be based on the application usage history of the current user, the application history of related users, or based on the application history of users in general. Users may be related based on a common geographical location, a common job type, a shared set of commonly used applications, age, gender, device type, or any other attribute that may be relevant to inferring that a workflow used by one user would be useful to another user.

In response to determining that application window 704 is often part of a side-by-side workflow, foldable device 102 may proactively display application launching menu 906 in region 106E. In this way, if a word processing application is launched, application window 704 and the word processing application will be part of the determined side-by-side workflow. To further facilitate the side-by-side workflow, foldable device 102 may also display an icon 910, hyperlink, or other means of launching the word processing application within application launching menu 906. In some configurations, icon 910 may be placed more prominently than if application window 704 was not part of a workflow with a word processing application. While FIG. 9 depicts an application launching menu 906, the same concept may be applied to other types of UI, including a taskbar, run menu, desktop icon, or any other way in which an application may be launched.

In some configurations, foldable device 102 may cause an application launched from an icon 912 in region 106D to be proactively displayed in a non-default region, e.g. 106E. Foldable device 102 may do this in order to enter the application into an application workflow with application window 704. In some configurations, foldable device 102 may proactively display the application itself in a non-default region, as opposed to UI that may be used to launch the application, when a frequency with which application window 704 is used with the application in the application workflow meets or exceeds a defined threshold.

Figure 10:
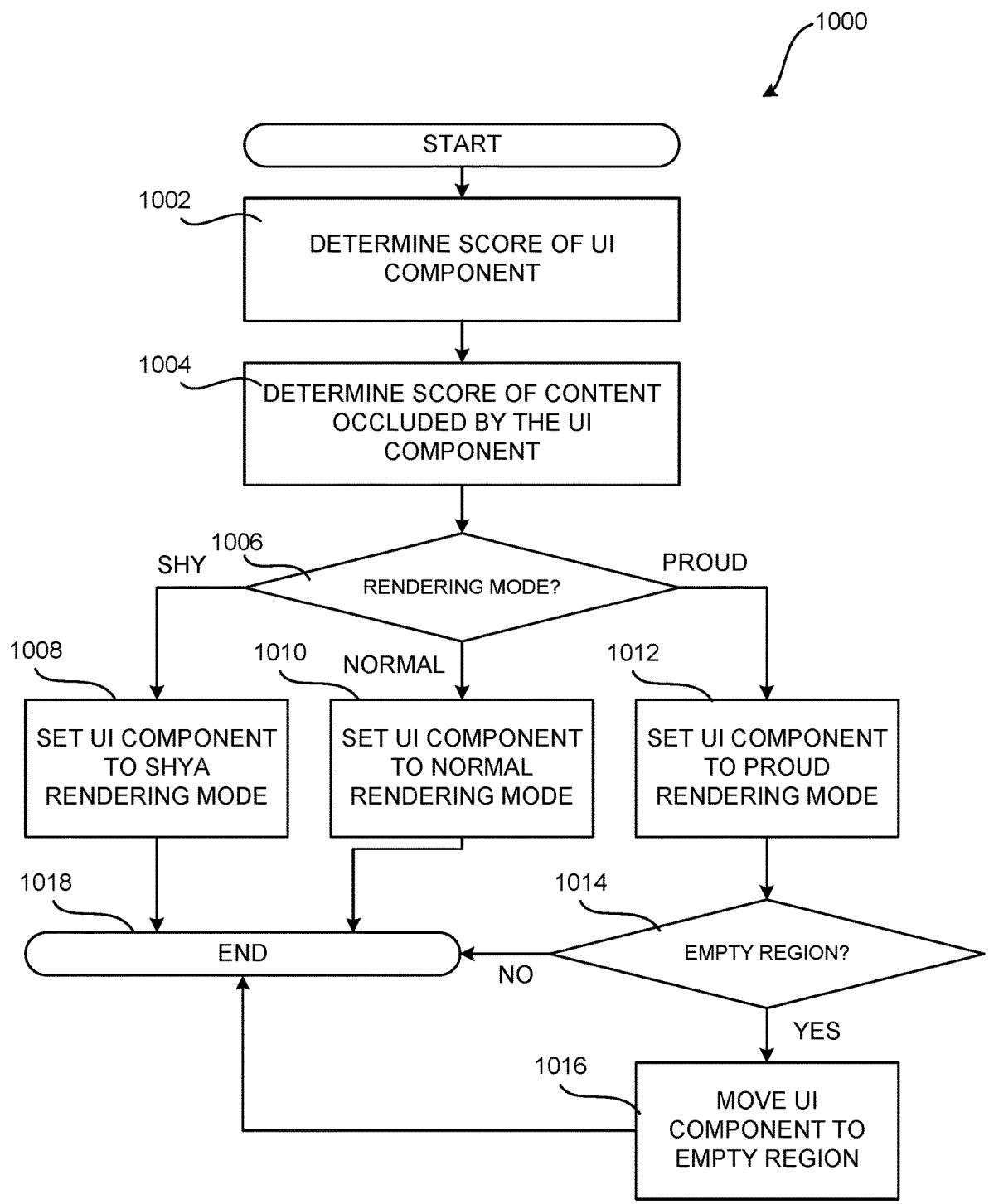
FIG. 10 is a flow diagram showing a routine that illustrates aspects of the operation of a foldable device for determining a UI component rendering mode based on content occlusion and a prediction of user intent, according to one embodiment.

FIG. 10 is a flow diagram showing a routine 1000 that illustrates aspects of the operation of a foldable device 102 for determining a rendering mode of a UI component based on content occlusion and a prediction of user intent. It should be appreciated that the logical operations described herein with regard to FIG. 10, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 1000 begins at operation 1002, where foldable device 102 determines a score associated with displaying UI component 402 as described in detail above. The routine 1000 then proceeds to operation 1004, where foldable device 102 determines a score associated with existing UI 406 that is visually occluded by UI component 402, as described in detail above.

The routine 1000 then proceeds to operation 1006, where foldable device 102 determines which rendering mode to use when displaying UI component 402, as described in detail above. If the score associated with UI component 402 is less than the score associated with occluded content 406, then the routine 1000 proceeds to operation 1008, where foldable device 102 displays UI component 402 using a shy rendering mode, as described in detail above.

If the score associated with UI component 402 is greater than or equal to the score associated with existing UI 406, then the routine 1000 proceeds to operation 1010, where foldable device 102 displays UI component 402 using a normal rendering mode, as described in detail above. If UI component 402 has a greater score than existing UI 406 by a defined margin, then foldable device may display UI component 402 using a proud rendering mode.

In some configurations, if foldable device 102 determines UI component 402 would ordinarily be displayed in region 106D but could be displayed in region 106E without occluding other content, then the routine 1000 proceeds to operation 1012, where foldable device 102 displays UI component 402 using a proud rendering mode as described in detail above. The routine 1000 proceeds from operations 1008 and 1010 to operation 1018, where it ends.

The routine 1000 proceeds from operation 1012 to operation 1014, where foldable device 102 determines if the UI component 402 fits into empty portion of region 106E. If UI component 402 can fit into an empty portion of region 106E, the routine 1000 proceeds to operation 1016, where foldable device 102 moves UI component 402 to the empty portion of region 106E, as described in detail above. If UI component 402 cannot fit into an empty portion of region 106E, routine 1000 proceeds to operation 1018 where it ends.

Figure 11:
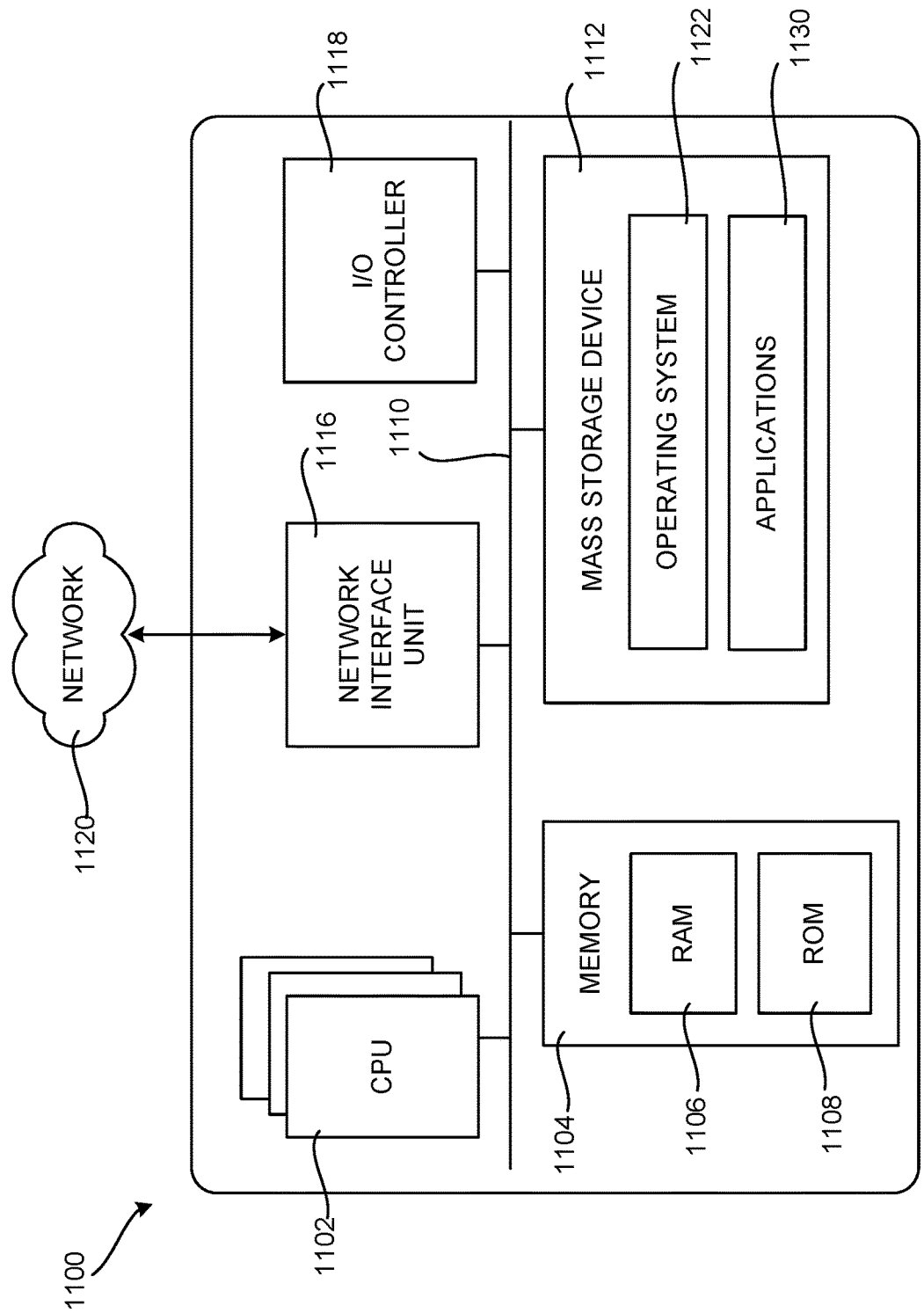
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement the hinged devices 102 and bendable devices 202 described herein. The illustrated architecture can also be utilized to implement other types of computing systems.

The computer 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computer 1100, such as during startup, can be stored in the ROM 1108. The computer 1100 further includes a mass storage device 1112 for storing an operating system 1122, application programs 1130, and other types of programs. The functionality described above is implemented by one or more of these programs in various configurations. The mass storage device 1112 can also be configured to store other types of programs and data.

The mass storage device 1112 is connected to the CPU 1102 through a mass storage controller (not shown) connected to the bus 1110. The mass storage device 1112 and its associated computer readable media provide non-volatile storage for the computer 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1100. For purposes of the claims, the phrase "computer storage medium," and variations thereof, does not include waves or signals per se or communication media.

According to various configurations, the computer 1100 can operate in a networked environment using logical connections to remote computers through a network such as the network 1120. The computer 1100 can connect to the network 1120 through a network interface unit 1116 connected to the bus 1110. It should be appreciated that the network interface unit 1116 can also be utilized to connect to other types of networks and remote computer systems. The computer 1100 can also include an input/output controller 1118 for receiving and processing input from a number of other devices, including a keyboard, mouse, touch input, a digital pen, or a physical sensor such as cameras and biometric sensors.

The computer 1100 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1100 supports a tap gesture in which a user taps a display once. A double tap gesture in which a user taps a display twice can also be supported. The double tap gesture can be used for various reasons including, but not limited to, zooming in or zooming out in stages. In some configurations, the computer 1100 supports a tap and hold gesture in which a user taps and maintains contact for at least a pre-defined time. The tap and hold gesture can be used for various reasons including, but not limited to, opening a context-specific menu.

In some configurations, the computer 1100 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1100 supports a flick gesture in which a user swipes a finger in the direction the user wants the screen to move. The flick gesture can be used for various reasons including, but not limited to, scrolling horizontally or vertically through menus or pages. In some configurations, the computer 1100 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the computing device 1100. As such, the above gestures should be understood as being illustrative and should not be construed as being limiting in any way.

It should be appreciated that the software components described herein, when loaded into the CPU 1102 and executed, can transform the CPU 1102 and the overall computer 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1100 in order to store and execute the software components presented herein. It also should be appreciated that the architecture shown in FIG. 11 for the computer 1100, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1100 might not include all of the components shown in FIG. 11, can include other components that are not explicitly shown in FIG. 11, or can utilize an architecture completely different than that shown in FIG. 11.

It should be appreciated that the computing architecture shown in FIG. 11 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computer-implemented method performed by a computing device 102, comprising: computing a score associated with a user interface (UI) component 402 to be displayed; computing a score associated with an existing UI 406 that will be occluded by the UI component 402 if the UI component 402 is displayed; performing a comparison between the score associated with the UI component 402 to be displayed and the score associated with the existing UI 406 that will be occluded by the UI component 402 if displayed; selecting a rendering mode for the UI component 402 based, at least in part, on the comparison; and displaying the UI component 402 in the selected rendering mode.

Clause 2. The computer-implemented method of clause 1, wherein the rendering mode is set to a first rendering mode when the score associated with the UI component to be displayed is less than the score associated with the existing UI that will be occluded by the UI component if displayed.

Clause 3. The computer-implemented method of clauses 1 and 2, wherein the rendering mode is set to a second rendering mode when the score associated with the existing UI that will be occluded by the UI component if displayed is less than the score associated with the UI component to be displayed and a difference between the score associated with the existing UI and the score associated with the UI component to be displayed does not exceed a predetermined amount.

Clause 4. The computer-implemented method of clauses 1-3, wherein the rendering mode is set to a third rendering mode when the score associated with the existing UI that will be occluded by the UI component if displayed is less than the score associated with the UI component to be displayed by at least a predetermined amount.

Clause 5. The computer-implemented method of clauses 1-41, wherein displaying the UI component in the first rendering mode comprises displaying the UI component transparently or translucently at least in part, auto-hiding the UI component if it does not receive an indication of a user input after a defined period of time, displaying the UI component in a minimized mode, or displaying a subset of UI sub-components that would be displayed by the UI component in a normal rendering mode.

Clause 6. The computer-implemented method of clauses 1-5, wherein displaying the UI component in the second rendering mode comprises displaying the UI component opaquely.

Clause 7. The computer-implemented method of clauses 1-6, wherein displaying the UI component in the third rendering mode comprises displaying the UI component proactively.

Clause 8. The computer-implemented method of clauses 1-7, wherein displaying the UI component proactively is based on a determination that a first application window is part of an application workflow that includes a second application window used concurrently with the first application window.

Clause 9. The computer-implemented method of clauses 1-8, wherein the computing device comprises a foldable computing device, wherein the application workflow includes the first application window having historically been displayed on a first display region of the foldable computing device while the second application window has historically been displayed on a second display region of the foldable computing device, and wherein the UI component is proactively displayed in the second display region in response to the first application window being displayed in the first display region.

Clause 10. The computing-implemented method of clauses 1-9, wherein the UI component can be activated to launch the second application window in the second display region.

Clause 11. The computer-implemented method of clauses 1-10, wherein the computing device periodically evaluates a plurality of potential UI components at a plurality of locations in a plurality of display regions to identify a UI component to proactively display in one of the plurality of display regions.

Clause 12. A foldable computing device 301, comprising: one or more processors 1102; and at least one non-transitory computer-readable storage medium 1112 having computer-executable instructions stored thereupon which, when executed by the one or more processors 1102, cause the foldable computing device 102 to: compute a score associated with a user interface (UI) component 402 to be displayed by the foldable computing device 102; compute a score associated with an existing UI 406 that will be occluded by the UI component 402 if the UI component 402 is displayed; perform a comparison between the score associated with the UI component 402 and the score associated with the existing UI 406 that will be occluded by the UI component 402 if the UI component 402 is displayed; select a rendering mode for the UI component 402 based, at least in part, on the comparison; and display the UI component 402 using the selected rendering mode 412.

Clause 13. The foldable computing device of clause 12, wherein the score associated with the existing UI is based at least in part on a content analysis of a piece of content included in the existing UI.

Clause 14. The foldable computing device of clauses 12 and 13, wherein the score associated with the UI component is based at least in part on a historical frequency of user interactions with other instances of the existing UI.

Clause 15. The foldable computing device of clauses 12-14, wherein the existing UI is divided into portions, wherein a score is generated for each portion of the existing UI, wherein the UI component is divided into portions, wherein a score is generated for each portion of the UI component, and wherein the rendering mode of each portion of the UI component is adjusted based at least in part on the score of that portion of the UI component and the scores of one or more portions of the existing UI that overlap that portion of the UI component.

Clause 16. The foldable computing device of clauses 12-15, wherein portions of the existing UI are identified based on clusters of user interaction events historically performed on the existing UI.

Clause 17. The foldable computing device of clauses 12-16, wherein the existing UI is generated by an application window, and wherein the existing UI is divided into portions based on user interface elements of the application window.

Clause 18. The foldable computing device of clauses 12-17, wherein occluding the existing UI lowers the score associated with the UI component.

Clause 19. A non-transitory computer-readable storage medium having computer-executable instructions stored thereupon which, when executed by a foldable computing device 102, cause the foldable computing device 102 to: receive an indication that an application associated with an application window 404 was invoked; determine an anticipated location of the application window 404; compute a score associated with a user interface (UI) component 402 that overlaps with at least a portion of the anticipated location of the application window 404; compute a score associated with a portion of the application window 404 that, if displayed, would overlap with the UI component 402; perform a comparison between the score associated with the UI component 402 and the score associated with the portion of the application window 404; select a rendering mode for the UI component 402 based, at least in part, on the comparison; and display the UI component 402 using the selected rendering mode.

Clause 20. The non-transitory computer-readable storage medium of clause 19, wherein the score associated with the portion of the application window is based at least in part on a historical frequency of user interactions with the portion of the application window.

Based on the foregoing, it should be appreciated that technologies for selecting a UI component rendering mode based on content occlusion and a prediction of user intent have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method performed by a computing device, comprising:
    computing a score associated with a user interface (UI) component to be displayed;
    computing a score associated with an existing UI that will be occluded by the UI component in an event the UI component is displayed;
    performing a comparison between the score associated with the UI component to be displayed and the score associated with the existing UI that will be occluded by the UI component in the event the UI component displayed;
    selecting a rendering mode for the UI component, from a plurality of different rendering modes, based at least in part on the comparison; and
    displaying the UI component in the selected rendering mode.

2. The computer-implemented method of claim 1, wherein the rendering mode is set to a first rendering mode when the score associated with the UI component to be displayed is less than the score associated with the existing UI that will be occluded by the UI component in the event the UI component displayed.

3. The computer-implemented method of claim 1, wherein the rendering mode is set to a second rendering mode when the score associated with the existing UI that will be occluded by the UI component in the event the UI component displayed is less than the score associated with the UI component to be displayed and a difference between the score associated with the existing UI and the score associated with the UI component to be displayed does not exceed a predetermined amount.

4. The computer-implemented method of claim 1, wherein the rendering mode is set to a third rendering mode when the score associated with the existing UI that will be occluded by the UI component in the event the UI component displayed is less than the score associated with the UI component to be displayed by at least a predetermined amount.

5. The computer-implemented method of claim 2, wherein displaying the UI component in the first rendering mode comprises displaying the UI component transparently or translucently at least in part, auto-hiding the UI component in an event the UI component does not receive an indication of a user input after a defined period of time, displaying the UI component in a minimized mode, or displaying a subset of UI sub-components that would be displayed by the UI component in a normal rendering mode.

6. The computer-implemented method of claim 3, wherein displaying the UI component in the second rendering mode comprises displaying the UI component opaquely.

7. The computer-implemented method of claim 4, wherein displaying the UI component in the third rendering mode comprises displaying the UI component proactively.

8. The computer-implemented method of claim 7, wherein displaying the UI component proactively is based on a determination that a first application window is part of an application workflow that includes a second application window used concurrently with the first application window.

9. The computer-implemented method of claim 8, wherein the computing device comprises a foldable computing device, wherein the application workflow includes the first application window having historically been displayed on a first display region of the foldable computing device while the second application window has historically been displayed on a second display region of the foldable computing device, and wherein the UI component is proactively displayed in the second display region in response to the first application window being displayed in the first display region.

10. The computing-implemented method of claim 9, wherein the UI component can be activated to launch the second application window in the second display region.

11. The computer-implemented method of claim 7, wherein the computing device periodically evaluates a plurality of potential UI components at a plurality of locations in a plurality of display regions to identify a UI component to proactively display in one of the plurality of display regions.

12. A foldable computing device, comprising:
one or more processors; and
at least one non-transitory computer-readable storage medium having computer-executable instructions stored thereupon which, when executed by the one or more processors, cause the foldable computing device to:
compute a score associated with a user interface (UI) component to be displayed by the foldable computing device;
compute a score associated with an existing UI that will be occluded by the UI component in an event the UI component is displayed;
perform a comparison between the score associated with the UI component and the score associated with the existing UI that will be occluded by the UI component in the event the UI component is displayed;
select a rendering mode for the UI component, from a plurality of rendering modes, based at least in part on the comparison; and
display the UI component using the selected rendering mode.

13. The foldable computing device of claim 12, wherein:
the score associated with the existing UI is computed based at least in part on an analysis of at least one of content or a function included in the existing UI; and
the score indicates at least one of (i) a predicted amount of utility of the existing UI based on the at least one of the content or the function or (ii) an importance of the at least one of the content or the function.

14. The foldable computing device of claim 12, wherein the score associated with the UI component is computed based at least in part on a historical frequency of user interactions with other instances of the UI component.

15. The foldable computing device of claim 12, wherein the existing UI is divided into portions, wherein a score is generated for each portion of the existing UI, wherein the UI component is divided into portions, wherein a score is generated for each portion of the UI component, and wherein the rendering mode of each portion of the UI component is adjusted based at least in part on the score of that portion of the UI component and the scores of one or more portions of the existing UI that overlap that portion of the UI component.

16. The foldable computing device of claim 15, wherein portions of the existing UI are identified based on clusters of user interaction events historically performed on the existing UI.

17. The foldable computing device of claim 16, wherein the existing UI is generated by an application window, and wherein the existing UI is divided into portions based on user interface elements of the application window.

18. A non-transitory computer-readable storage medium having computer-executable instructions stored thereupon which, when executed by a computing device, cause the computing device to:
receive an indication that an application associated with an application window was invoked;
determine an anticipated location of the application window;
compute a score associated with a user interface (UI) component that overlaps with at least a portion of the application window based on the anticipated location;
compute a score associated with the portion of the application window that would overlap with the UI component;
perform a comparison between the score associated with the UI component and the score associated with the portion of the application window;
select a rendering mode for the UI component, from a plurality of rendering modes, based at least in part on the comparison; and
display the UI component using the selected rendering mode.

19. The non-transitory computer-readable storage medium of claim 18, wherein the UI component comprises a taskbar or an options menu generated by an operating system of the computing device.

20. The computer-implemented method of claim 1, wherein an individual score indicates at least one of (i) a predicted amount of utility based on at least one of UI content or a UI function or (ii) an importance of the at least one of the UI content or the UI function.

* * * * *